E. J. CHRISTIE.
UNICYCLE.
APPLICATION FILED NOV. 14, 1917.
1,290,087.
Patented Jan. 7, 1919.
5 SHEETS—SHEET 3.
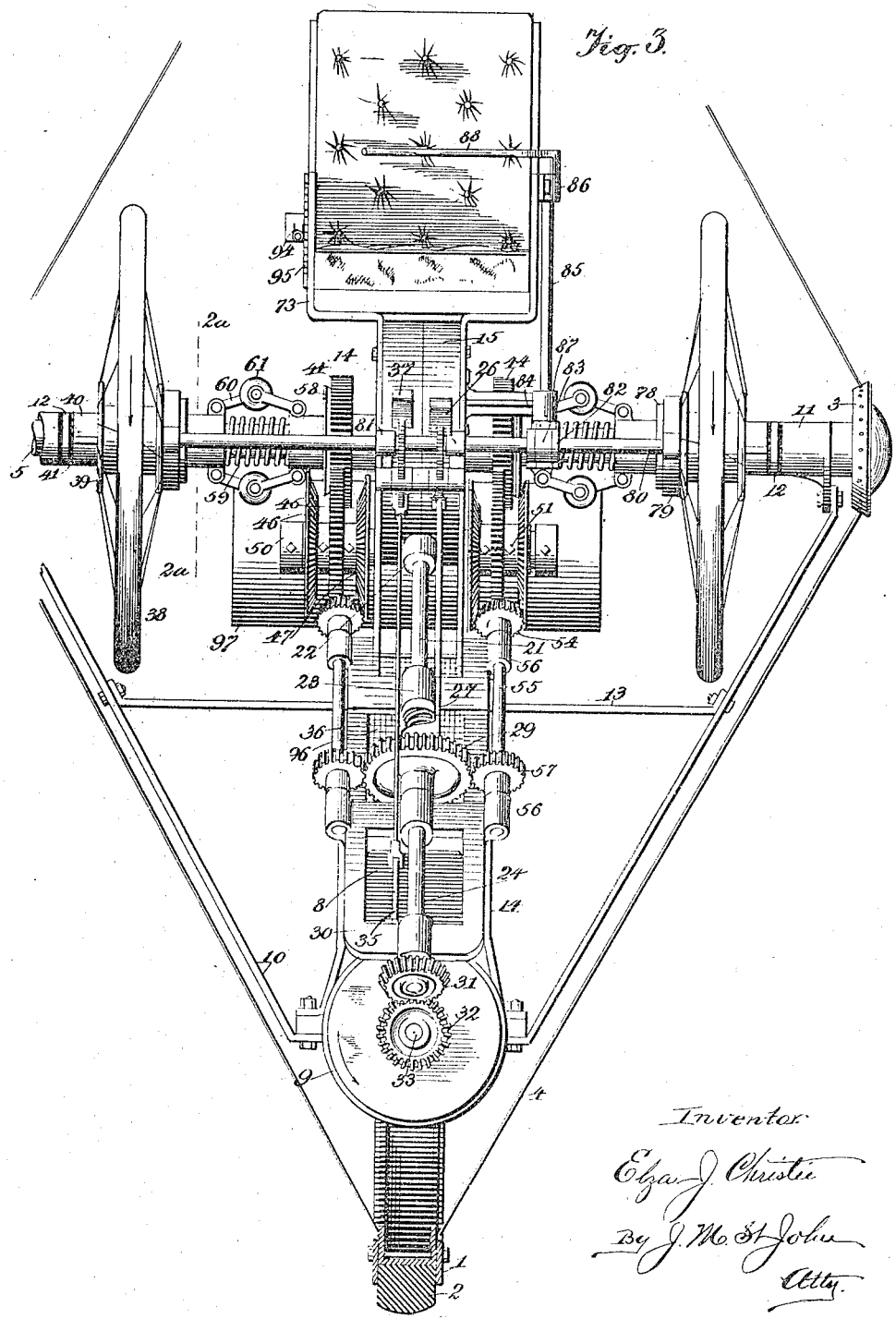

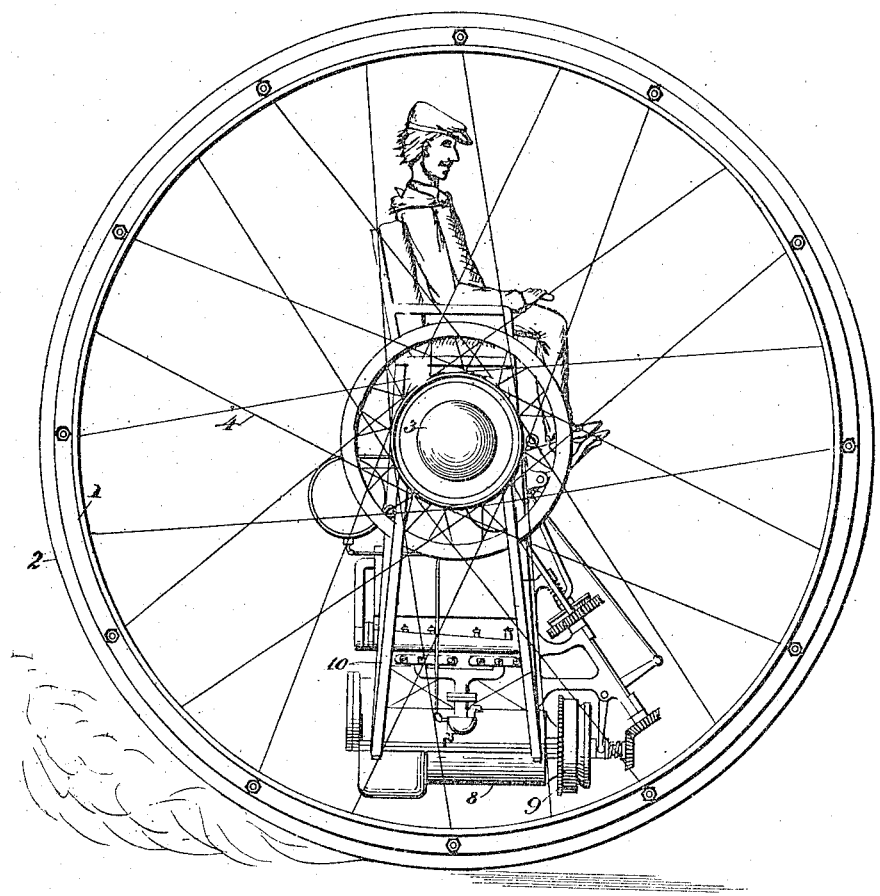

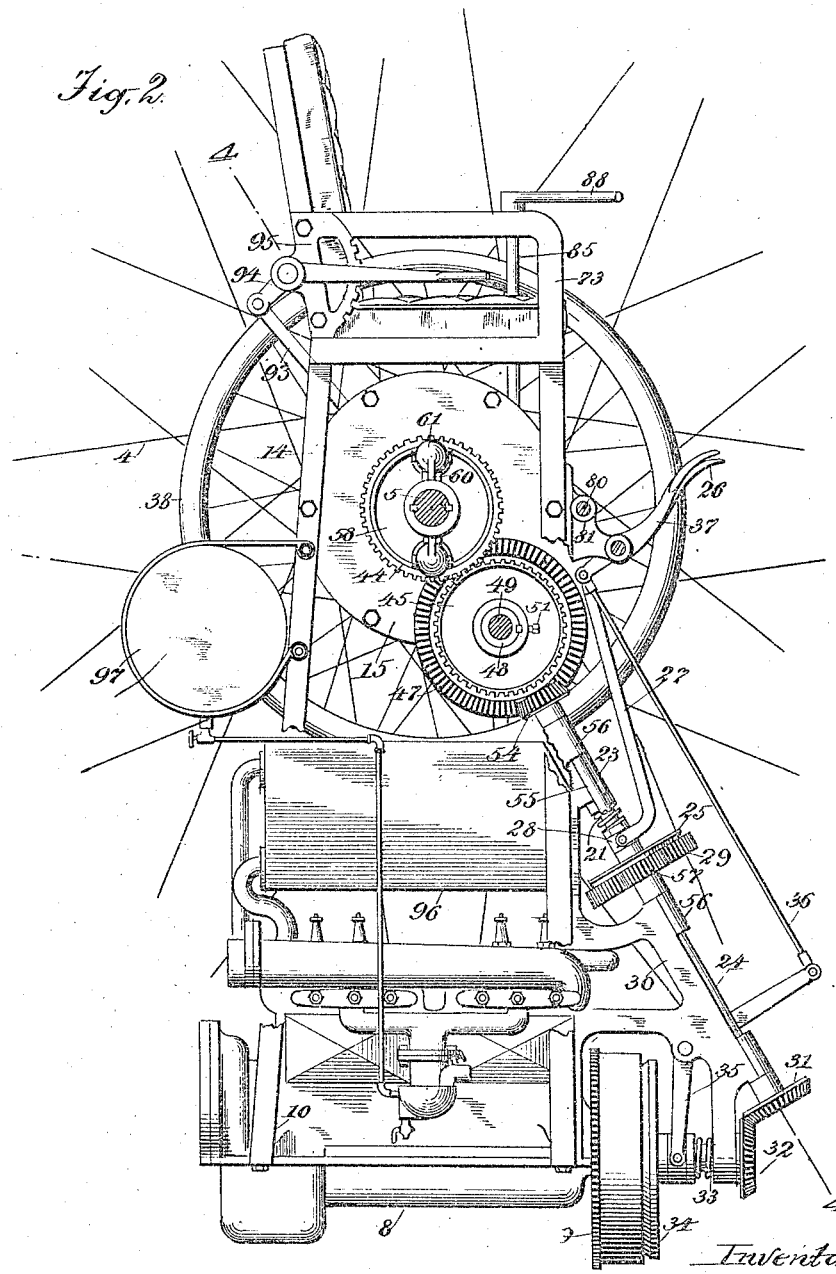

E. J. CHRISTIE.
UNICYCLE.
APPLICATION FILED NOV. 14, 1917.
1,290,087.
Patented Jan. 7, 1919.
5 SHEETS—SHEET 4.
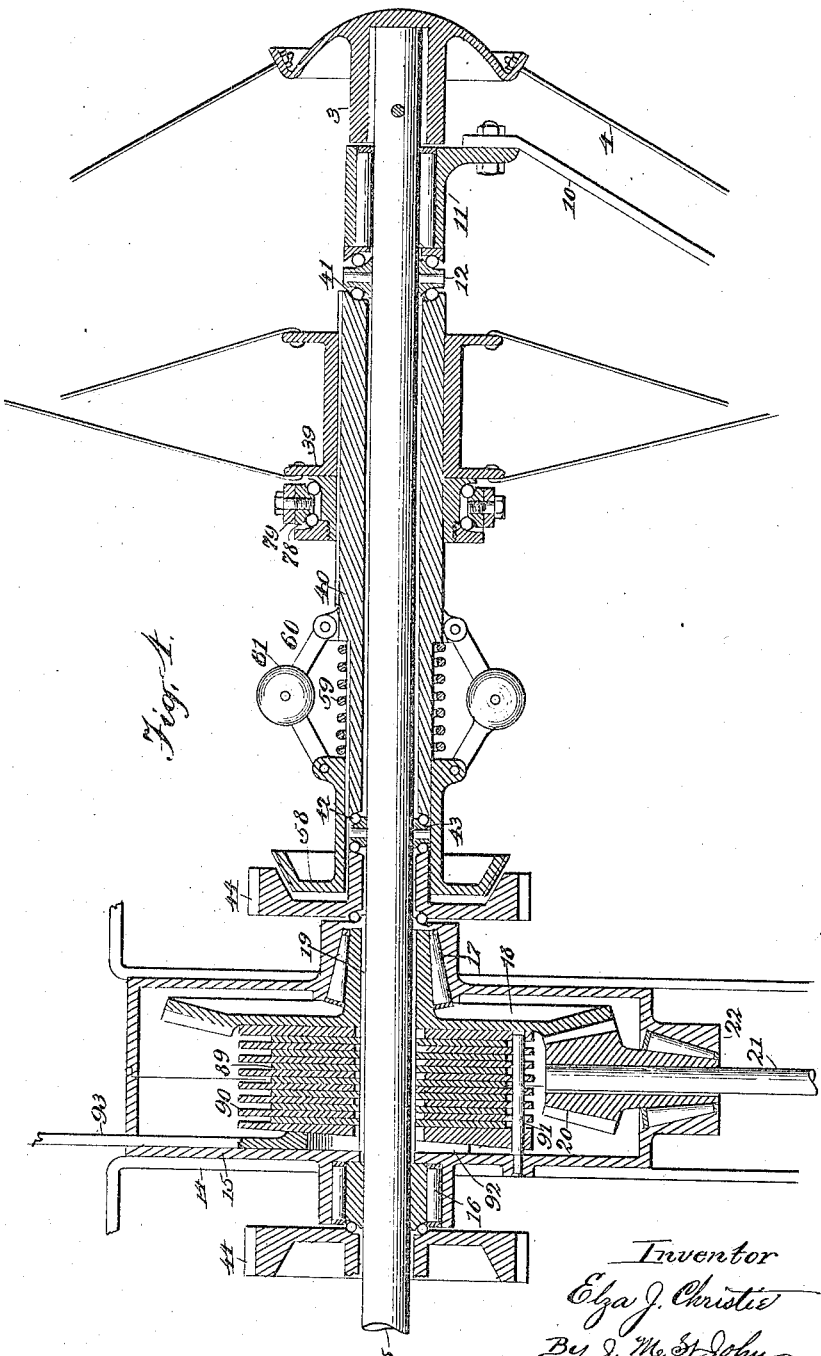

E. J. CHRISTIE.
UNICYCLE.
APPLICATION FILED NOV. 14, 1917.
1,290,087.
Patented Jan. 7, 1919.
5 SHEETS—SHEET 5.
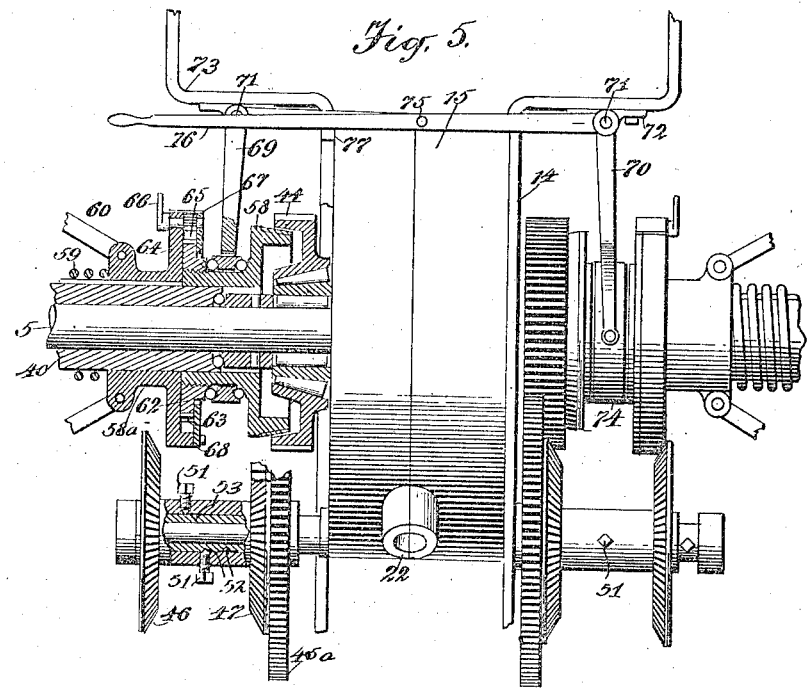

UNITED STATES PATENT OFFICE.

ELZA J. CHRISTIE, OF MARION, IOWA.

UNICYCLE.

1,290,087. Specification of Letters Patent. Patented Jan. 7, 1919.

Application filed November 14, 1917. Serial No. 202,046.

*To all whom it may concern:*

Be it known that I, ELZA J. CHRISTIE, a citizen of the United States, residing at Marion, in the county of Linn and State of Iowa, have invented certain new and useful Improvements in Unicycles; and I do hereby declare the following to be a full, clear, and exact description of the invention, such as will enable others skilled in the art to which it appertains to make and use the same.

This invention relates to unicycles, and more particularly to those of a type adapted for racing and exhibition purposes, and for such utilitarian uses as may arise in the development of the art.

The invention embraces certain improvements in a unicycle such as is described and claimed in my former Letters Patent of the United States, numbered 1,191,566 and bearing date of July eighteenth, 1916, to which reference may be had. Certain features of the present invention are also set out briefly in an application for British Patent No. 9780 of 1916, but not yet issued. These special features will be referred to more particularly hereafter.

The present invention aims to improve the general construction of the unicycle; to provide a better and more scientific mounting of the motor; to improve the transmission mechanism; to provide simple and convenient brakes, clutches and other controls; to secure a better location and arrangement of the driver's position in the wheel, and as a matter of prime importance, to provide for the spinning of the gyroscope wheels both in the same direction, forward or back, or in reverse directions, as shown in said U. S. patent, and for completely disengaging them from the motor driving mechanism, if desired.

Such other objects as the invention contemplates will appear in the description and claims following, reference being had to the accompanying drawings, in which:—

Figure 1 is a side elevation illustrating my improved unicycle as in use. Fig. 2 is a side elevation of the operating mechanism of the unicycle as seen to the right of the line 2ª—2ª of Fig. 3, a few of the parts being in section, and some broken away. Fig. 3 is a front view of the same mechanism, with a sectional, skeleton view of the main wheel. Fig. 4 is a section taken on the line 4—4 of Fig. 2, showing the mechanism immediately connecting with and adjacent to the main axle. Fig. 5 is a front view, partly sectional, showing a modification in the transmission mechanism, which will be fully hereinafter described. Fig. 6 is a plan view of the same, with fragments of the gyroscope wheels added. Fig. 7 is a fragmentary detail, showing a ratchet and pawl mechanism for transmitting motion in one direction, either forward or back, to the gyroscope wheels.

The main wheel comprises a rim 1; a suitable tire 2, preferably of rubber; hubs 3 connecting spokes 4, preferably of the suspending type, and a central axle 5 to which the hubs are securely and rigidly attached. As seen in Fig. 3, the rim being in central, vertical section, the main outline of the wheel is a diamond, with the axle crossing its shorter axis. This form provides ample room between the spokes for the operating mechanism and for the occupant of the unicycle. It also admits of the wheel lying on its side, partially inclined, when idle, but in a position such that the operator may start the motor and then clutch in the gyroscope wheels, which immediately bring the main wheel to vertical position as soon as they attain a proper speed.

In its improved form, as herein shown, the motor 8 is mounted in line with the wheel-rim, instead of the axle, as shown in said former patent, thus permitting the motor to hang low in the main wheel without interfering with the diagonal spokes of the diamond-shaped structure above mentioned. The motor shown is a familiar type of gasolene engine, adapted, as indicated by its cogged fly-wheel 9, for self-starting, but no self-starter is herein shown. The motor is hung by diagonal suspenders 10 from the main axle by bearings 11, preferably of the roller type, as shown in Fig. 4. Their indrawing end-thrust is suitably borne as by a ball-bearing thrust-collar 12 pinned to the axle. The most of this indrawing thrust is eliminated by cross-ties 13 tending to hold the suspenders suitably outspread. Inner suspenders 14 are also provided, which connect with a central gear-case 15 journaled on the axle, or, more precisely, on parts secured to the axle. The preferred construction is shown in Fig. 4, where a simple type of roller bearing 16 is shown at the left, and at the other side a cone bearing 17 is shown, as better adapted to counteract the thrust of the main driving bevel-gear 18 rigidly secured to the axle, as by splines 19. The bearing is shown in its simplest form, the hub of the gear forming one part and the hub of the gear-casing another, with the cones interposed.

Engaging the main bevel-gear 18 is a pinion 20 secured to a diagonal shaft 21 journaled at 22 and 23. Preferably this shaft does not connect directly with the motor, nor with its primary clutch (to be described presently), but is adapted to engage a jack-shaft 24 by a friction clutch 25, which may be disengaged by a foot-lever 26 connecting with said clutch by a fork 27 and collar 28 in a familiar way. The clutch is shown as adapted to engage a spur-gear 29 attached to the jack-shaft, which is suitably journaled in a main frame 30 attached to the forward set of suspenders. To the lower end of the jack-shaft is secured a bevel-gear 31 engaging a similar gear 32 at the end of a short shaft 33 alined with the motor-shaft. This is provided with a shiftable clutch-cone 34 engaging the motor fly wheel, and is operated by means of a forked bell-crank lever 35 linked by a rod 36 with a foot-lever 37. This may be designated as the primary clutch and the one above it as the intermediate, or secondary clutch. The primary clutch is of course released to start the motor. The need of the secondary clutch will appear presently. When both are engaged it is evident that the main wheel will be driven forward by the motion of the motor.

Between the outlying hubs of the main wheel and the central gear-case two gyroscope wheels 38 are mounted on the main axle so as to spin independently thereof. They are also mounted so as to be shifted sidewise, for the purpose of steering the main wheel, as fully explained in said former patent. The mounting of the gyroscopes is therefore preferably as illustrated in Fig. 4. The hub 39 of the gyroscope is mounted slidably on a splined sleeve 40, and this turns on ball-bearings 41 and 42 between the fixed collars 12 and 43, the latter of which also takes the side-thrust of the main gear case, through the interposed gear 44 which gives motion to the sleeve. This gear engages a spur gear 45, which in Fig. 3 is shown interposed between two bevel-gears 46 and 47 and in rigid connection therewith. These gears are mounted on a sleeve 48 turning on a stud 49 secured to the main gear case. The sleeve is somewhat longer than the hub of the gears, and is held in place on the stud by a collar 50. By means of set-screws 51 the gears may be set at any desired position on the sleeve, at the extreme right or left by engaging the sockets 52, or in the middle by engaging the socket 53. The latter position puts both bevel-gears out of engagement with a bevel pinion 54 attached to a shaft 55 journaled in bearings 56, and provided with a pinion 57 engaging the large spur gear 29, as will be evident by reference to Fig. 3, where the parts are shown externally. The construction just described is in duplicate on each side of the main gear-case and middle driving shaft, and is adapted to transmit motion to the two gyroscope wheels by their respective sleeves. In Fig. 3, as will be seen, the bevel gears at the right are in engagement with the interposed pinions, and in this position both gyroscope wheels revolve in the same direction as the main traction wheel, assuming the motor to be running as indicated by the arrow. This is assumed to be the normal direction of revolution. The construction also admits of the reversal of this movement of the gyroscope wheels, or their being run in opposite directions, to produce unusual, even spectacular results. Provision has been made for throwing both pairs of bevel gears out of connection with the driving mechanism, as above noted, but it is not thought that this will be necessary often, if ever, in actual practice.

It is of course necessary that the gyroscope wheels should turn at a high rate of speed. This will in any case be much in excess of the turning speed of the track wheel, and may exceed that of the motor. As shown in Fig. 3 the spur-gear 45 cannot exceed the adjacent bevel-gears in size, which tends to limit the speed of the gyroscope wheels. In Fig. 5, however, the corresponding spur-gear 45$^a$ is shown set outside, or rather back of the bevel gear, and this admits of any desired ratio and rate of speed, without changing the ratio of the spur-gears 29 and 57.

It is desirable that a normal speed in the motor should produce the maximum speed in the gyroscope wheels, and that this be not increased by any increase in the speed of the motor. This is accomplished by means of an automatic speed-governed clutch, described as follows:

Referring to Fig. 4 it will be seen that the spur-gear 44 is mounted to turn freely around the main axle. Splined to the adjacent sleeve 40 is a clutch-cone 58, and between its opposite end and a shoulder of the sleeve is mounted a compression spring 59 tending to force the clutch into engagement with the internal cone of the gear. To toggle links 60 are connected governor balls 61. When the revolution of the sleeve exceeds the desired maximum, the centrifugal action of the balls releases the clutch, and any further increase in the speed of the sleeve, and its connected gyroscope wheel is prevented. As the speed of the sleeve diminishes slightly the clutch again engages, and a practically uniform speed is thus maintained.

While it may not be necessary to set the opposing bevel-gear 46 and 47 out of mesh with the interposed pinion, it is desirable to disengage the motor from the gyroscope wheels, so that the latter may spin independently of the former, and whether it be running or not. Two devices for this purpose are shown in Fig. 5, one acting automatically, and the other under the control of the operator. It will be seen that the hub of the cone 58 is flanged at 62 with a ratchet 63. Adjacent this ratchet is a flange 64 on the hub 58a with which the governor toggle connects. On this flange is pivoted a pawl 65, provided with a short trip-lever 66. A spring 67 engages the central angle of the double pawl, and holds it in engagement when tilted either way. A flange-ring 68 serves to hold the flange and gear together, so that the pull of the governor will disengage the clutch. It will be evident that the gyroscope wheels may thus be driven positively in either direction, as desired, but the stoppage of the motor will not arrest their spinning, a matter necessary both for convenience and for safety.

The other device is a manual shift for the clutch 58, and comprises a pair of bell-crank, forked levers 69 and 70 attached to rock-shafts 71 journaled at 72 to the upper frame 73, and connecting at their forked ends with shift-collars 74 suitably engaging the clutches. The levers connect pivotally at 75, one lever being extended to form a hand-lever 76. When depressed to the position shown in Fig. 5 the levers lock, and are held against further downward movement by a stop 77. This serves as a convenient emergency release for the gyroscope driving mechanism, and also as an auxiliary release in case of a stoppage of power, permitting the ratchet clutch to spin bodily, and without wear on the ratchet, or the noise incident to its action. The shift-lever, as will be seen, is conveniently disposed under the knees of the operator.

Above the main gear-case the main frame 73 is expanded to form a seat for the operator, who is thus placed above the operating mechanism, and free from all obstruction. The frame also serves as a support, in whole or in part, for the guide and brake levers, the construction and action of which devices will now be described.

Engaging the inner sides of the gyroscope wheel hubs are shift-collars 78, and these connect with forks 79 attached to a rod 80 mounted to slide in bearings 81. Affixed to the rod is a collar 82 provided with a side-thrust ring 83, and to this is connected a short lever 84 secured to a vertical rock-shaft 85 journaled at 86 and 87. To the upper end of this shaft is secured a hand-lever 88, which, as will be seen (Figs. 3 and 6) is disposed crosswise of the operator's seat and directly in front of him. By a pull or a push on this lever the gyroscope wheels are shifted to the right or left at will, and by this means the direction of travel of the unicycle is guided and controlled, as fully described in said former patent.

The improved brake herein shown is of the multiple disk type, and comprises a series of disks 89 splined to the main axle, and another series, 90, slidably connecting with the main gear-case, as by studs 91. As shown in Fig. 4, the left outer disk has an inclined outer face, against which bears the similarly inclined face of a fork 92 slidable between the disks and the side of the gear-case. As the forked wedge is pushed inwardly the disks are forced together and against the inner face of the main driving gear. The stem 93 of the wedge passes through the rear wall of the gear-case and connects at its end with a lever 94, which may be set at any desired position by means of a toothed sector 95. Inasmuch as the efficiency of the brake is limited to the depending weight of the operating mechanism, it is of course desirable to carry such weight as low as possible, and this is made practicable by the improved arrangement and construction herein shown.

In the drawings the radiator of the motor is shown at 96, and the fuel supply tank at 97, the weight of these parts and their contents adding to the necessary resistance for propulsion and for retardation by brake, as will be evident.

Having thus described my invention, I claim:

1. In a unicycle, the combination of a motor, driving mechanism connecting the motor and the unicycle, a pair of gyroscope wheels mounted concentric to the unicycle, and mechanism adapted to propel said gyroscope wheels in either direction with respect to said unicycle or each other.

2. In a unicycle, the combination of a motor, driving mechanism connecting the motor and the unicycle, a pair of gyroscope wheels mounted concentric to the unicycle, and mechanism independent of the unicycle-driving mechanism, adapted to propel said gyroscope wheels in either direction with respect to the unicycle or each other.

3. In a unicycle, a traction wheel having a single rim, hubs equally and widely separated therefrom, spokes converging to said rim, a connecting axle, a motor whose axis is in a plane with the wheel-rim, and a suspending frame having arms diverging from the motor and connecting with bearings mounted on said axle near the hubs.

4. In a unicycle, a traction wheel having a single rim, lateral hubs widely separated, spokes converging to said rim, a connecting axle, and a motor-suspending frame comprising diagonal side-bars, connecting crossties, and bearings connecting with the upper ends of said diagonal bars, and adapted to run on said axle.

5. In a unicycle, a traction wheel having a single rim, lateral, widely separated hubs, spokes converging to said rim, a connecting axle, and a motor-supporting frame, comprising diagonal side-bars, bearings connecting with their upper ends, and intermediate, substantially vertical bars and bearings connecting with their upper ends, all of said bearings being mounted rotatably on said axle.

6. In a unicycle having a long central axle and gyroscope wheels mounted revolubly thereon, a motor hung from the axle with its axis transverse thereto, a centrally disposed jack-shaft, parallel lateral shafts geared thereto and adapted to drive said gyroscope wheels positively in one direction, but permitting them to spin independently of the motor.

7. In a unicycle having gyroscope wheels substantially as described, a motor suspended from the main axle, driving mechanism adapted to impart a rapid revolution to said gyroscope wheels in either direction with respect to the unicycle or each other, but permitting them to revolve independently of the motor, and a clutch to positively engage or disengage such driving mechanism.

8. In a unicycle having gyroscope wheels, a suspended motor, and mechanism adapted to transmit motion from the motor to said wheels, mechanism adapted to automatically limit the speed of said gyroscope wheels irrespective of the speed of the motor.

9. In a unicycle having gyroscope wheels, a suspended motor, and mechanism adapted to transmit motion from the motor to said wheels, centrifugal governors deriving their revolution from the wheels, and means whereby they may automatically engage or disengage said motion-transmitting mechanism.

10. In a unicycle having gyroscope wheels, a suspended motor, mechanism adapted to transmit motion from the motor to said wheels, centrifugal governors attached to said wheels, and a clutch connecting each governor with said motion transmitting mechanism at a predetermined rate of speed.

11. In a unicycle having gyroscope wheels, a suspended motor, and traction-wheel driving mechanism, a transmission for the said gyroscope wheels substantially as described, comprising lateral shafts geared to the main driving shaft, pinions thereon, oppositely facing bevel gears adapted to be shifted for alternative engagement with said pinions, spur gears connecting rigidly with said bevel gears, and gears mounted revolubly on the main axle of the unicycle, and adapted to connect operatively with the gyroscope wheels.

12. In a unicycle having a motor and transmission mechanism hung from its axle, with the axis of the motor transverse thereto, and having gyroscope wheels revoluble on said axle, an operator's seat mounted above the axle, foot-levers accessible therefrom, clutches adapted to engage and disengage both the main wheel and the gyroscope driving transmission, and connections of said foot-levers therewith.

13. In a unicycle having a motor and transmission frame hung from its axle, with an operator's seat above it, a driving-gear secured to the axle, a casing therefor, a multiple-disk brake to engage the face of said gear, a wedge adapted to compress said disks, and a hand-lever adjacent to the operator's seat connecting with said wedge.

In testimony whereof I affix my signature in presence of two witnesses.

ELZA J. CHRISTIE.

Witnesses:
A. T. COOPER,
J. M. ST. JOHN.

Copies of this patent may be obtained for five cents each, by addressing the "Commissioner of Patents, Washington, D. C."